(12) United States Patent
Adkisson et al.

(10) Patent No.: US 7,623,482 B2
(45) Date of Patent: *Nov. 24, 2009

(54) SYSTEM AND METHOD FOR EFFECTUATING THE TRANSFER OF DATA BLOCKS INCLUDING A HEADER BLOCK ACROSS A CLOCK BOUNDARY

(75) Inventors: Richard W. Adkisson, Dallas, TX (US); Huai-Ter Victor Chong, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 946 days.

This patent is subject to a terminal disclaimer.

(21) Appl. No.: 10/625,291

(22) Filed: Jul. 23, 2003

(65) Prior Publication Data

US 2004/0233865 A1 Nov. 25, 2004

Related U.S. Application Data

(60) Provisional application No. 60/469,504, filed on May 10, 2003.

(51) Int. Cl.
*H04B 7/212* (2006.01)

(52) U.S. Cl. .................... 370/324; 375/354; 713/324; 714/731

(58) Field of Classification Search .......... 370/395, 370/324; 375/354; 713/324; 714/731
See application file for complete search history.

(56) References Cited

U.S. PATENT DOCUMENTS

| 5,347,559 | A | | 9/1994 | Hawkins et al. |
| 6,084,934 | A | * | 7/2000 | Garcia et al. ............... 375/370 |
| 6,115,823 | A | * | 9/2000 | Velasco et al. ............. 713/322 |
| 6,134,155 | A | | 10/2000 | Wen |
| 6,249,875 | B1 | * | 6/2001 | Warren ..................... 713/400 |
| 6,317,806 | B1 | * | 11/2001 | Audityan et al. ............ 711/101 |
| 6,874,063 | B1 | * | 3/2005 | Arimilli et al. ............. 711/118 |
| 2001/0043098 | A1 | * | 11/2001 | Locker et al. .............. 327/156 |
| 2002/0144039 | A1 | | 10/2002 | Lackey et al. |
| 2002/0199124 | A1 | | 12/2002 | Adkisson |
| 2003/0016697 | A1 | * | 1/2003 | Jordan ...................... 370/466 |
| 2003/0204555 | A1 | * | 10/2003 | Jones et al. ................ 709/200 |
| 2004/0004975 | A1 | * | 1/2004 | Shin et al. ................. 370/471 |

(Continued)

OTHER PUBLICATIONS

Affidavit of Richard W. Adkisson, Feb. 17, 2005, 4 pages.

(Continued)

*Primary Examiner*—Seema S. Rao
*Assistant Examiner*—Sai-Ming Chan

(57) ABSTRACT

A system and method for effectuating the transfer of data blocks including a header block across a clock boundary between a first clock domain and a second clock domain. In one embodiment, a first circuit portion provides the data blocks including the header block to a second circuit portion. Control logic associated with the second circuit portion is operable to process the header block and generate in response to the header block a hint signal which is transferred via a synchronizer at least one data cycle prior to the transfer of the data blocks to a third circuit portion disposed in the second clock domain. A control block associated with the third circuit portion operates responsive to the hint signal to generate data transfer control signals for controlling the third circuit portion in order to control output of the data blocks in a particular ordered grouping.

16 Claims, 7 Drawing Sheets

U.S. PATENT DOCUMENTS

2004/0024946 A1* 2/2004 Naumann et al. ........... 710/309

OTHER PUBLICATIONS

Notice of Allowance dated Oct. 7, 2008 for U.S. Appl. No. 10/625,365 in the U.S. Patent and Trademark Office.

Final Office Action dated Jul. 9, 2008 for U.S. Appl. No. 10/625,365 in the U.S. Patent and Trademark Office.

Office Action dated Jan. 2, 2008 for U.S. Appl. No. 10/625,365 in the U.S. Patent and Trademark Office.

* cited by examiner

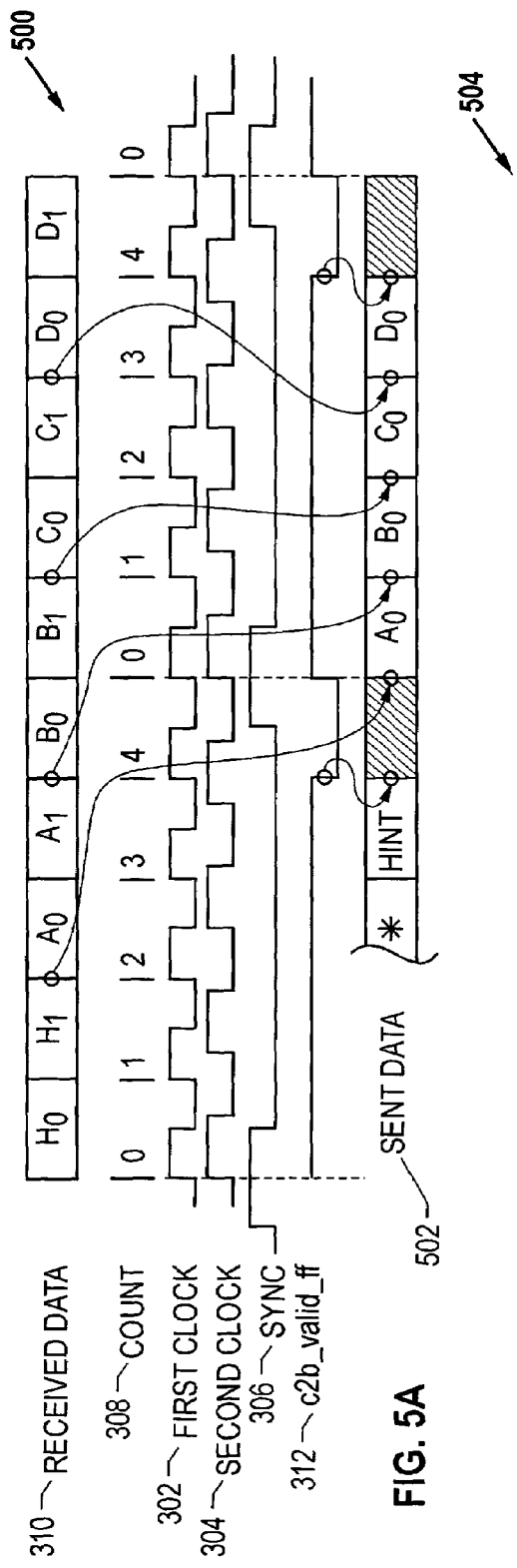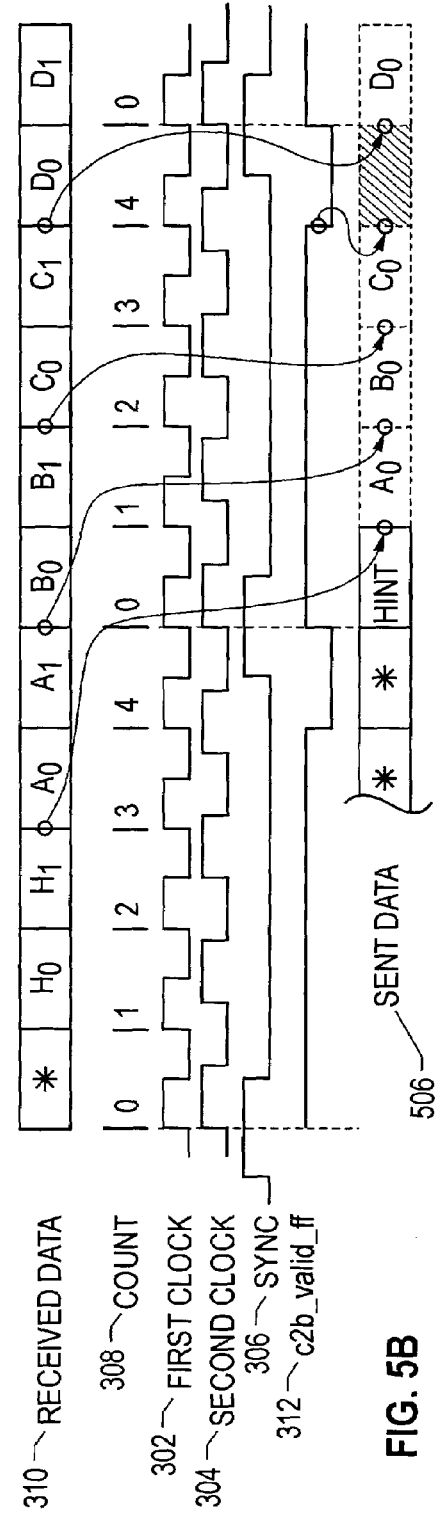
FIG. 5A
FIG. 5B

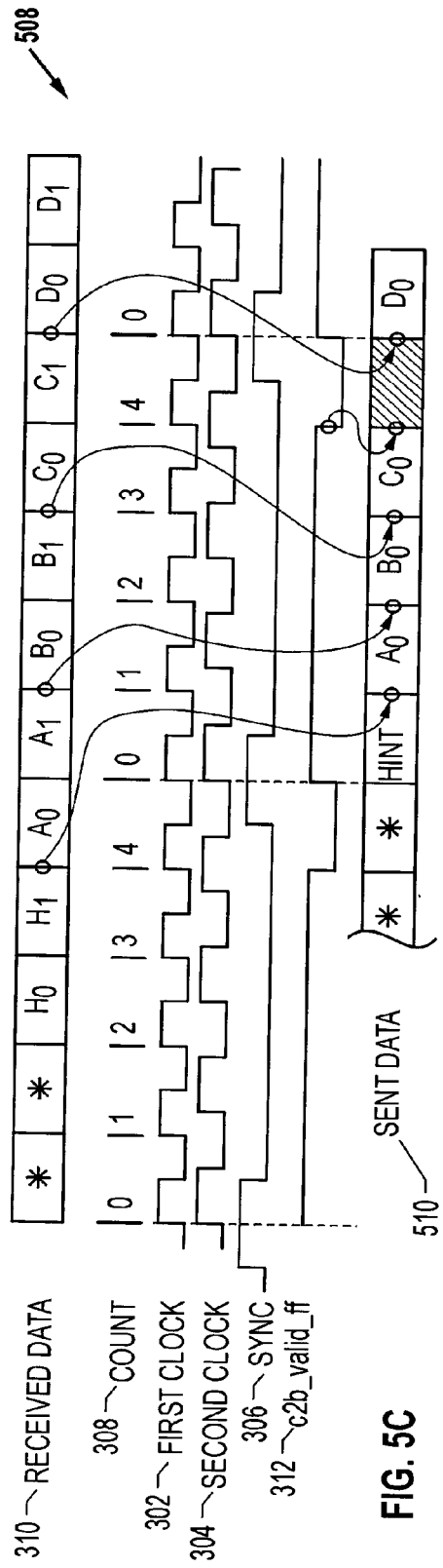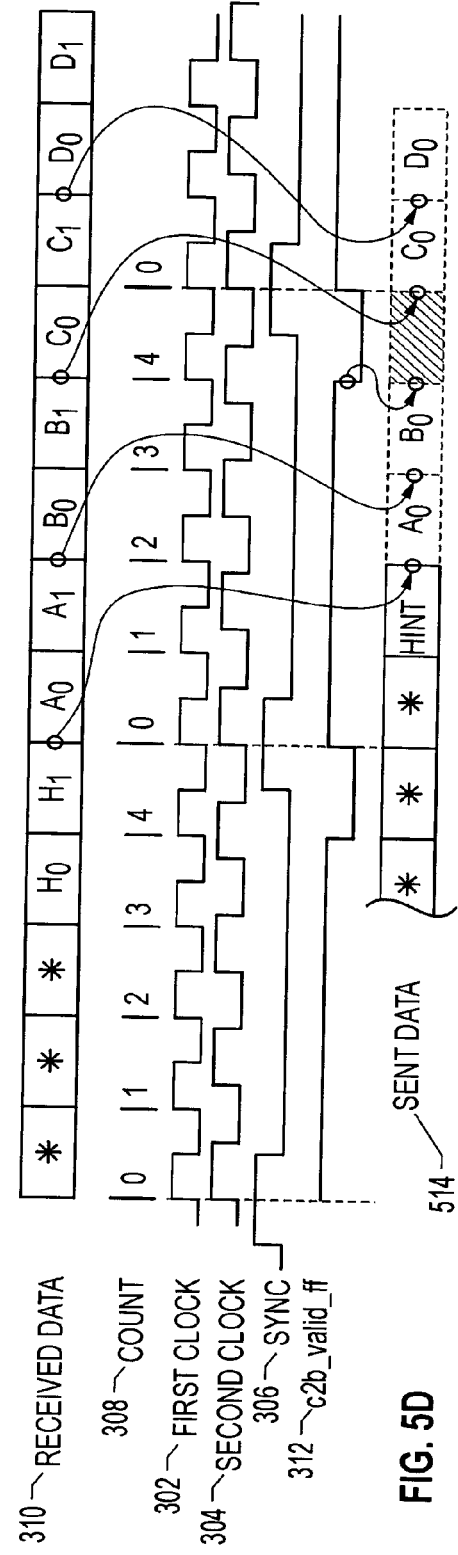

SYSTEM AND METHOD FOR EFFECTUATING THE TRANSFER OF DATA BLOCKS INCLUDING A HEADER BLOCK ACROSS A CLOCK BOUNDARY

PRIORITY UNDER 35 U.S.C. §119(e) & 37 C.F.R. §1.78

This nonprovisional application claims priority based upon the following prior U.S. provisional patent application entitled: "System And Method For Effectuating The Transfer Of Data Blocks Including A Header Block Across A Clock Boundary," Ser. No.: 60/469,504, filed May 10, 2003, in the names of Richard W. Adkisson and Huai-Ter Victor Chong, which is hereby incorporated by reference.

CROSS-REFERENCE TO RELATED APPLICATION(S)

This application discloses subject matter related to the subject matter disclosed in the following commonly owned co-pending patent application: "System and Method for Effectuating the Transfer of Data Blocks Across a Clock Boundary," U.S. patent application Ser. No. 10/625,365, filed Jul. 23, 2003, in the name(s) of: Richard W. Adkisson and Huai-Ter Victor Chong, which is hereby incorporated by reference.

BACKGROUND

By way of example, FIG. 1 depicts a timing sequence 100 of two clock domains having an N:(N−1) frequency ratio wherein data transfer across the clock boundary between the domains results in an extra data cycle or "dead cycle" in which data cannot be transferred. As is well known, data transfer operations between circuitry of a first clock domain and circuitry of a second clock domain are effectuated by synchronizer circuitry disposed therebetween. Further, the first and second clock domains are operable with clock signals that have a particular cycle ratio. For instance, the circuitry of the first clock domain ("fast clock domain") may be clocked with a first clock signal (CLK1) that is faster than a second clock signal (CLK2) used for clocking the circuitry of the second clock domain ("slow clock domain") such that there are N first clock cycles to (N−1) second clock cycles. In one application, core clock circuitry and bus clock circuitry of a computer system may represent the first and second clock domains, respectively, wherein CLK1 and CLK2 signals correspond to the core clock (CC) and bus clock (BC) signals.

A synchronizer controller circuit (not shown in FIG. 1) is usually provided for controlling the operation of synchronizer circuitry disposed between the two clock domains. Additionally, a control signal such as a SYNC pulse may be generated based on a predetermined temporal relationship between CLK1 and CLK2 for synchronizing the data transfer operations. For example, the SYNC pulse may be generated when a rising edge of the CLK1 signal coincides with a rising edge of the CLK2 signal, which commences a data transmit window for the transfer of data blocks, which may include one or more data bits, from one clock domain to the other clock domain.

The timing sequence 100 of FIG. 1 illustrates an embodiment of CLK1 104, CLK2 106 and SYNC pulse signal 108, wherein for every five ticks of CLK1 there are four ticks of the slow clock (i.e., CLK2). A cycle count 102 refers to the numbering of CLK1 cycles in a particular data transmit window of the timing sequence 100. Data to be transferred from the fast clock domain is clocked at CLK1, that is, 5 data block pulses per window are available.

As alluded to before, the SYNC pulse 108 is high on coincident rising edges of CLK1 and CLK2 and the data transfer operations across the clock boundary between the two clock domains are timed with reference to the SYNC pulse. In a normal condition where there is no skew (or, jitter, as it is sometimes referred to) between CLK1 and CLK2, the coincident edges occur on the rising edges of the first cycle (cycle 0) as shown in FIG. 1. Since there are five CLK1 cycles and only four CLK2 cycles, CLK1 domain circuit portion cannot transmit data during one cycle resulting in what is known as a "dead tick," as CLK2 domain circuit portion does not have a corresponding time slot for receiving it. Typically, the cycle that is least skew tolerant is the one where data is not transmitted and, in the exemplary timing sequence shown in FIG. 1, it is the fourth cycle (i.e., cycle 3).

Skew between CLK1 and CLK2 signals can cause, for example, a variance in the positioning of the SYNC pulse which affects the data transfer operations between CLK1 and CLK2 domains. In the exemplary 5:4 frequency ratio scenario set forth above, if CLK2 leads CLK1 by a quarter cycle for instance, then instead of the edges being coincident at the start of cycle 0, they will be coincident at the start of cycle 1 and the dead tick's location may accordingly vary. In similar fashion, if CLK2 lags CLK1 by a quarter cycle, the edges will be coincident at the start of the last cycle (i.e., cycle 4). Regardless of the skew between the clock cycles, however, there will be a cycle where a data block cannot be sent, resulting in data transfer at less than full bandwidth. Furthermore, in channelized data transmission scenarios, where multiplexed data blocks are transmitted from a fast clock domain to a slow clock domain sequentially as contiguous data blocks, the latency introduced by dead cycles presents problems. Additionally, these problems can be particularly limiting where header blocks associated with multiplexed data blocks require excessive processing time.

SUMMARY

A system and method are disclosed that effectuate the transfer of data blocks including a header block across a clock boundary between a first clock domain and a second clock domain. In one embodiment, a first circuit portion provides the data blocks including the header block to a second circuit portion. Control logic associated with the second circuit portion is operable to process the header block and generate in response to the header block a hint signal which is transferred via a synchronizer at least one data cycle prior to the transfer of the data blocks to a third circuit portion disposed in the second clock domain. A control block associated with the third circuit portion operates responsive to the hint signal to generate data transfer control signals for controlling the third circuit portion in order to control output of the data blocks in a particular ordered grouping.

BRIEF DESCRIPTION OF THE DRAWINGS

FIG. 5A depicts a timing drawing of data received at a first cycle and sent data associated with a control signal of the system illustrated in FIG. 3;

FIG. 5B depicts a timing drawing of data received at a second cycle and sent data associated with the control signal of the system illustrated in FIG. 3;

FIG. 5C depicts a timing drawing of data received at a third cycle and sent data associated with the control signal of the system illustrated in FIG. 3;

FIG. 5D depicts a timing drawing of data received at a fourth cycle and sent data associated with the control signal of the system illustrated in FIG. 3.

DETAILED DESCRIPTION OF THE DRAWINGS

Figure 1:
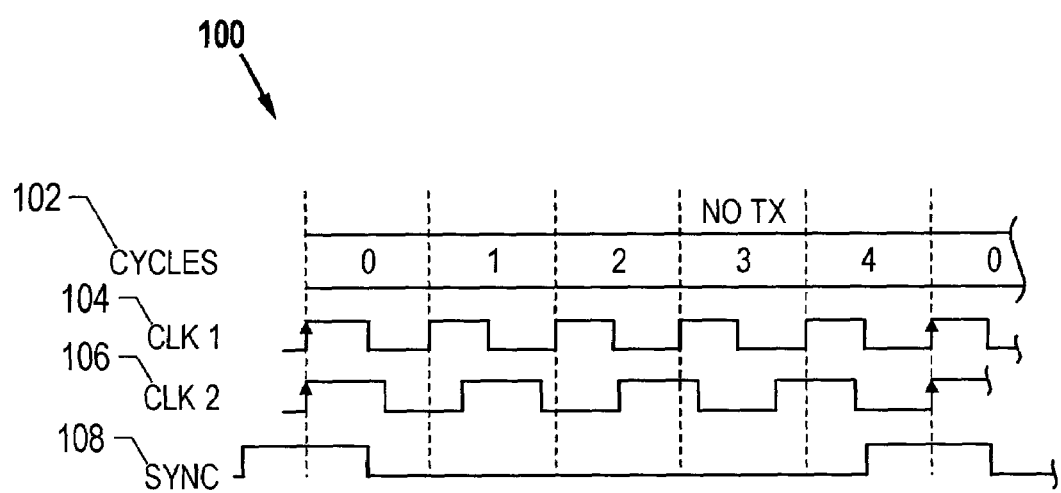
FIG. 1 (Prior Art) depicts a timing sequence of two clock domains having a known frequency ratio wherein data transfers across the clock boundary using a conventional synchronizer results in an extra data cycle in which data cannot be transferred.
Figure 2:
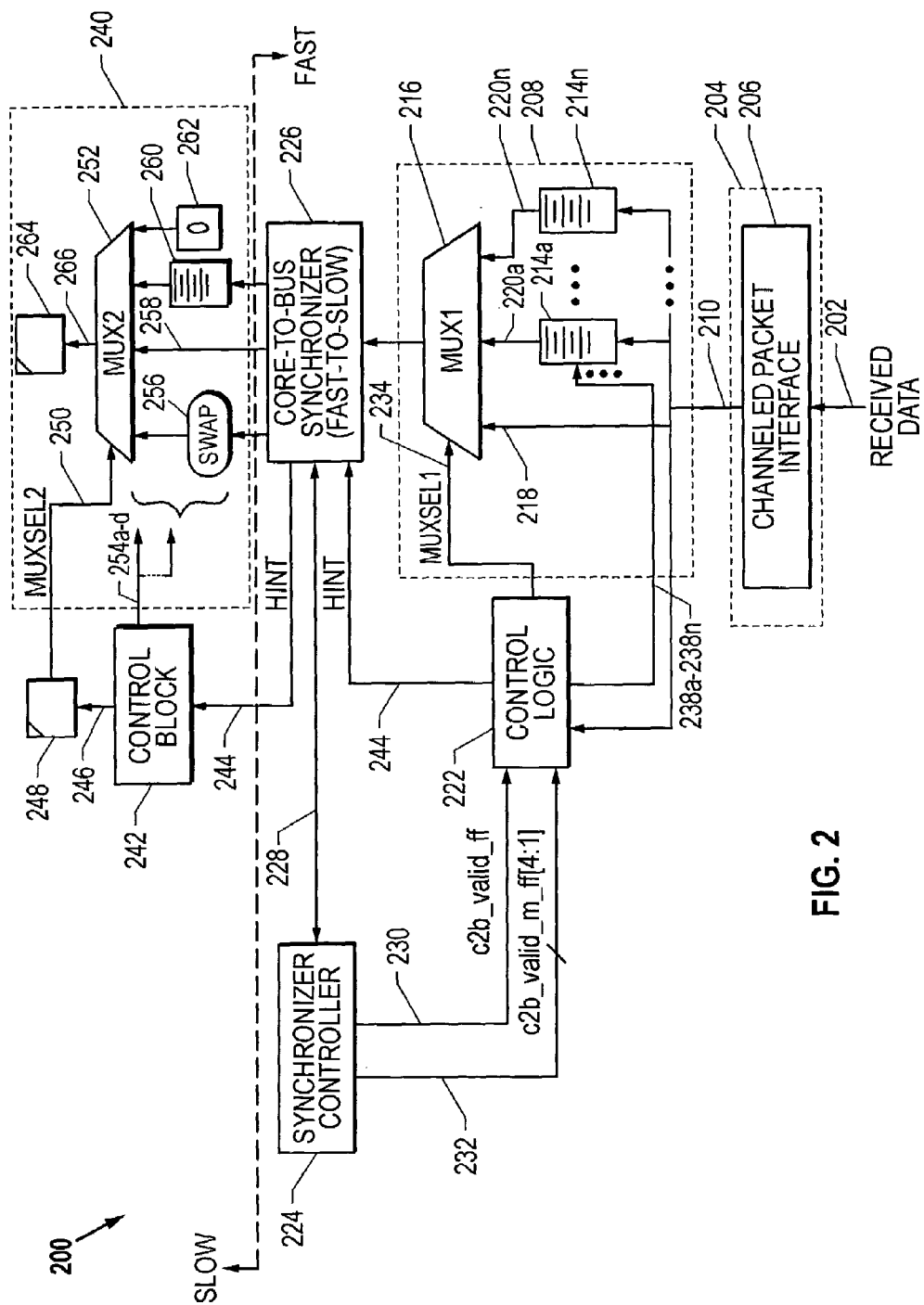
FIG. 2 depicts a block diagram of a system for effectuating the transfer of data blocks including a header block across a clock boundary between a first clock domain and a second clock domain, wherein the header block is processed for generating an advance notification or "hint" of a data transfer operation.

In the drawings, like or similar elements are designated with identical reference numerals throughout the several views thereof, and the various elements depicted are not necessarily drawn to scale. Referring now to FIG. 2, therein is depicted a system 200 for effectuating the transfer of data blocks including a header block across a clock boundary between a first clock domain (e.g., a core clock domain) having N fast clock cycles and a second clock domain (e.g., a bus clock domain) having M slow clock cycles such that N/M>1. Received data, e.g., core data generated by circuitry in the first clock domain, is provided on an incoming data path 202 at full bandwidth for transport to a first circuit portion 204 that includes a channeled packet interface 206. The received data may include a data packet comprising N data pulses or blocks including a header block in a timing cycle window. The header block may provide protocol control information about the data packet and may be positioned at the beginning of a data packet, e.g., $H_0A_0B_0C_0D_0$.

In one embodiment, the data blocks are intervaled and each intervaled data block may include one or more bits that are spaced apart by an interval element which may include empty cycles. For example, the data may take the form $H_0\_A_0\_B_0\_C_0\_D_0$ wherein each "_" represents an empty cycle. In one embodiment, the received data may be multiplexed data that includes at least two sets of interleaved data blocks. In this embodiment, the data blocks are positioned in a spaced arrangement. For example, the data may take the form $H_0H_1A_0A_1B_0B_1C_0C_1D_0D_1$ if two packets of interleaved data blocks, i.e., data blocks $H_0A_0B_0C_0D_0$ and data blocks $H_1A_1B_1C_1D_1$, are present, or $H_0H_1H_2A_0A_1A_2B_0B_1B_2C_0C_1C_2D_0D_1D_2$ if three packets of interleaved data blocks, i.e., $H_0A_0B_0C_0D_0$, $H_1A_1B_1C_1D_1$ and $H_2A_2B_2C_2D_2$, are present. It should be appreciated, however, that the teachings presented herein are equally applicable to intervaled and non-intervaled data blocks.

The first circuit portion 204 provides the data blocks to a second circuit portion 208 via data path 210. Second circuit portion 208 includes at least one queue, for example, queues 214a through 214n, for transmitting data blocks to a multiplexer (MUX) block 216 via data paths 220a through 220n, respectively. In one embodiment, the queues are first-in-first-out (FIFO) queues. In order to transmit the incoming intervaled data including a header block received via data path 210 as contiguous data, portions of the intervaled data are temporarily stored. The series of queues 214a through 214n provide temporary storage for the incoming data blocks received from the data path 210. The duration of the temporary storage, if required for a particular data block, depends on the total number of data blocks in the received data and the number of dead cycles. In one embodiment, the number of dead cycles equals N-M. Data path 218 transmits data received from the data path 210 to the MUX block 216 without queuing.

The header is stripped or removed from the incoming data packet and forwarded to a control logic block 222 associated with the second circuit portion 208. The control logic block 222 processes the header block and generates, in response to the header block, a hint signal 244 which is transferred at least one data cycle prior to the transfer of the data blocks to a third circuit portion 240 associated with the second clock domain. It should be appreciated that depending on the complexity of the data packet, the processing time of the header will vary. Accordingly, the transmission from the first clock domain and the receipt in the second clock domain of the data blocks contained in the data packet may be affected by the processing of the header.

To minimize the latency associated with header processing and solve associated timing issues, the control logic block 222 provides the third circuit portion 240 in the second clock domain with advance notice via the hint signal 244 which includes protocol control information relative to the processing of the header block. This enables the third circuit portion 240 and other circuitry in the second clock domain time to prepare for the arrival of the data blocks. For example, depending on the processing time of the header, the data blocks associated with the header may need to be temporarily queued in the second clock domain or immediately forwarded to other circuitry in the second clock domain. Based on the information stored in the header and the number of dead cycles, the control logic block 222, which may take the form of a state machine, calculates the number of data blocks in the intervaled data and, accordingly, the length of time to store each data block and the appropriate location for the hint signal.

A synchronizer controller 224 is in communication with a core-to-bus synchronizer 226 as illustrated by a data flow line 228. The synchronizer controller 224 provides a series of dead cycle control signals, c2b_valid_ff 230 and c2b_valid_m_ff[4:1] 232, which provide zero to four cycles advance notice of the location or locations of the dead cycles between the first and second clocks. The synchronizer controller 224 provides its advance knowledge of the position of the dead cycles to the control logic block 222 so that the second circuit portion 208 may be controlled to send data to the synchronizer 226 whereby the sent data may be optimally arranged about the dead cycles, which dead cycles are to be removed by the synchronizer 226 in operation, resulting in an ordered and contiguous data output to the second clock domain. The control logic 222 associated with the second circuit portion provides a MUX selection control signal 234 to the MUX1 block 216 and a series of control signals (control signals 238a-238n for clocking out data blocks stored in the queues 214a-214n) so that appropriate data blocks can be selected as MUX output.

Control block 242 (CLK2 domain) associated with the third circuit portion 240 operates responsive to the hint signal 244 transferred via the synchronizer 226 to generate a plurality of CLK2 domain control signals in order to anticipate the arrival of data and prepare the hardware of the second clock domain accordingly. One CLK2 domain control signal 246 may be registered using a control register 248 for generating a MUXSEL2 control signal 250 which controls a MUX2 252. The remaining CLK2 control signals 254a-254d control a SWAP block 256, a direct data path 258, a queue block 260, and a logic 0 block 262 so that the MUX2 252 can output the appropriate sequence of data blocks to an I/O data pad 264 via data path 266 in the second clock domain. Depending on the time taken by control logic block 222 to process the header, different control signals 254a-254d are employed. For example, if the processing of the header is delayed, then the control signal 254c may be sent to the queue 260 in order to buffer the transfer of the data from the synchronizer 226 into the second clock domain. Alternatively, if the processing of the header is occurring quickly, the control signal 254b and the data path 258 may be employed to forward the data directly to the I/O pad 264 of the second clock domain. Hence, the control block 242 operates responsive to the hint signal to generate data transfer control signals for controlling the third circuit portion in order to control output of the data blocks in a particular ordered grouping whether the ordered grouping involves temporarily storing the data blocks or providing the data blocks to circuitry in the second clock domain without queuing.

Accordingly, the data blocks received from the channeled packet interface 206 are transmitted as contiguous data output with one or more interleaved dead cycles from the MUX1 block 216 to the synchronizer 226, i.e., a fast-to-slow synchronizer such as a core-to-bus synchronizer, operating under the control of the synchronizer controller 224. Additionally, as described, the hint signal is sent to circuitry in the second clock domain at least one cycle prior to the sending of the contiguous data output with one or more interleaved dead cycles. By way of illustration, continuing with the example of receiving multiplexed data, for instance, having two interleaved data packets including header blocks, such as $H_0H_1A_0A_1B_0B_1C_0C_1D_0D_1$, the data is transmitted sequentially and contiguously to a second clock domain third circuit portion 240 as $SA_0B_0C_0D_0A_1B_1C_1D_1$, wherein "S" is the hint signal. By providing the circuitry in the second clock domain with advance knowledge that a data block transfer may occur via a hint signal, the hardware of the second clock domain may make decisions in anticipation of the data blocks to move the data blocks into the second clock domain faster or slower, as required, thereby solving timing and throughput problems. Moreover, by interleaving the dead cycles between the first and second clocks, based on the advance knowledge provided by the synchronizer controller, into the contiguous data transmitted to the core-to-bus synchronizer, the present system minimizes latency and provides for the efficient transfer of data across clock boundaries.

Figure 3:
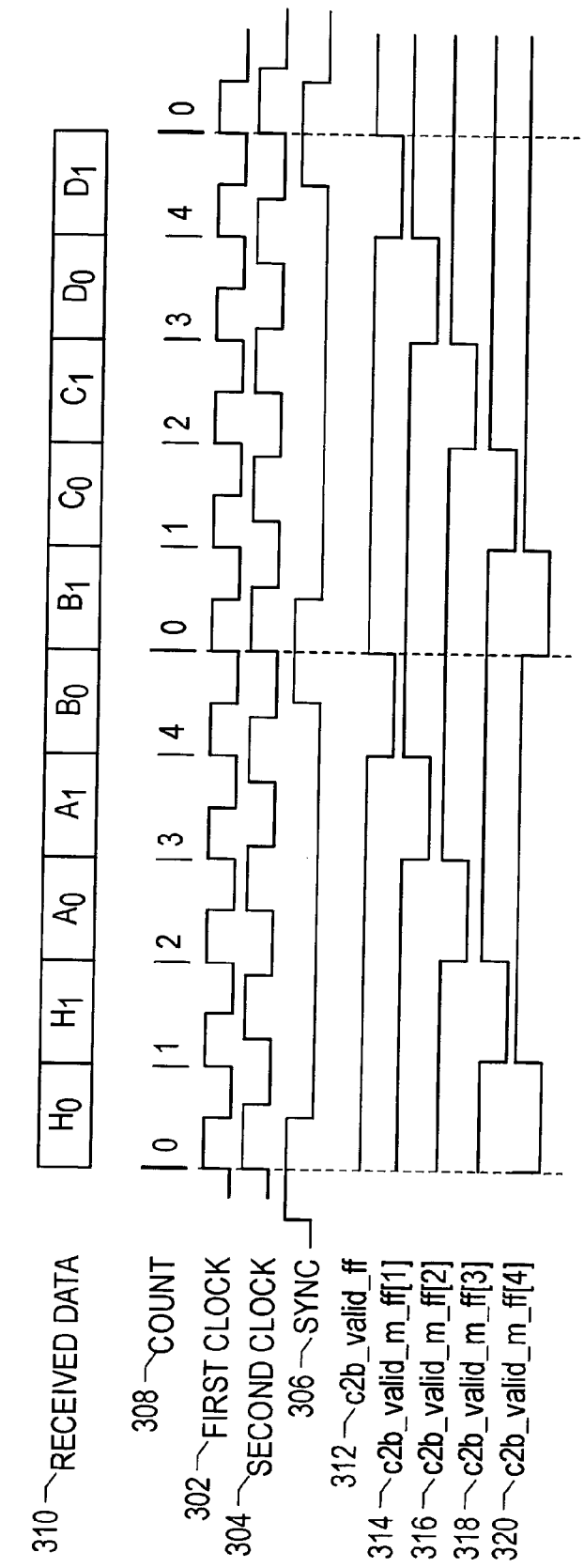
FIG. 3 depicts a timing drawing of the various signals associated with the system for effectuating the transfer of data blocks including a header block.

FIG. 3 depicts a timing drawing of the various signals associated with the system 200 described hereinabove. As illustrated, the timing sequence 300 exemplifies an embodiment of a FIRST CLOCK 302, a SECOND CLOCK 304 and a SYNC pulse signal 306, wherein within each timing window, five FIRST CLOCK signals 302 are present for every four SECOND CLOCK signals 304. A cycle COUNT 308 refers to the numbering of FIRST CLOCK signals 302 in a particular data transmit window of the timing sequence 300. Received data 310, i.e., core data, includes two multiplexed data packets, packets 0 and 1 which are to be transferred from the fast clock domain as represented by the FIRST CLOCK signal 302 to the slow clock domain as represented by the SECOND CLOCK signal 304. The data blocks of each packet are designed by their respective subscripts 0 and 1. For example, packet 0 comprises data blocks $A_0$, $B_0$, $C_0$, and $D_0$ (with a header $H_0$) that are interleaved with the data blocks of packet 1 which include data blocks $A_1$, $B_1$, $C_1$, and $D_1$ (with a header $H_1$). The SYNC pulse signal 306 may be generated based on a predetermined temporal relationship between the FIRST CLOCK and the SECOND CLOCK. As illustrated, the SYNC pulse is high on the coincident rising edges of the FIRST CLOCK and the SECOND CLOCK and the data processing operations of the second circuit portion are timed with reference to the SYNC pulse. As alluded to in the Background, since the FIRST CLOCK has five cycles and the SECOND CLOCK has four cycles, the FIRST CLOCK domain circuit portion cannot transmit data during one cycle resulting in one dead cycle, as the SECOND CLOCK domain circuit portion does not have a corresponding time slot for receiving it. The dead cycle control signals, c2b_valid_ff 312, c2b_valid_m_ff[1] 314, c2b_valid_m_ff[2] 316, c2b_valid_m_ff[3] 318, and c2b_valid_m_ff[4] 320, provided by the synchronizer controller to the control logic are advance notice indicative of the location of the dead cycle between the FIRST CLOCK domain and the SECOND CLOCK domain. Specifically, the c2b_valid_ff control signal 312 indicates that the dead cycle is occurring at the 5th cycle, cycle 4, the c2b_valid_m_ff[1] control signal 314 provides one cycle advance notice that the dead cycle is at the 5th cycle, cycle 4, the c2b_valid_m_ff[2] control signal 316 provides two cycles advance notice that the dead cycle is at the 5th cycle, cycle 4, the c2b_valid_m_ff[3] control signal 318 provides three cycles advance notice that the dead cycle is at the 5th cycle, cycle 4, and the c2b_valid m_ff[4] control signal 320 provides four cycles advance notice that the dead cycle is at the 5th cycle, cycle 4.

Figure 4:
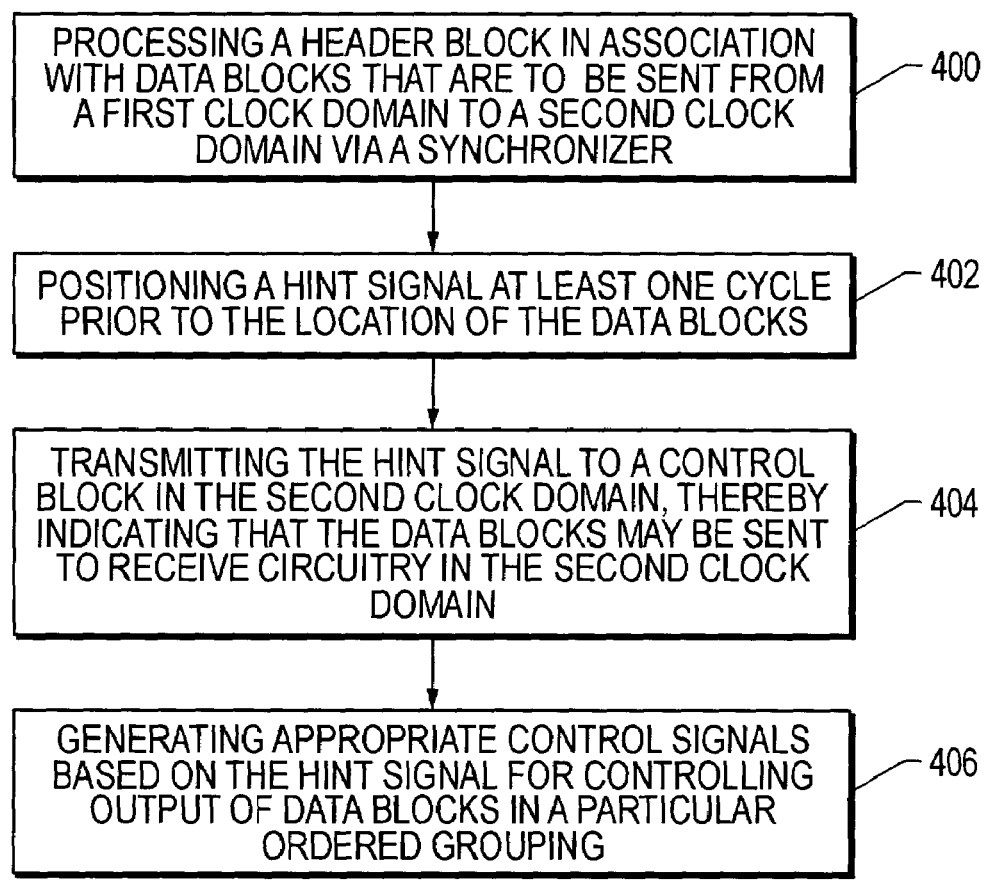
FIG. 4 depicts a flow chart illustrating an embodiment of a method for effectuating the transfer of data blocks including a header block across a clock boundary between a first clock domain and a second clock domain.

FIG. 4 depicts a flow chart of an embodiment of a method for effectuating the transfer of data blocks using a hint signal across a clock boundary between a first clock domain and a second clock domain. At block 400, a header block is processed in association with the data blocks that will be sent from the first clock domain to the second clock domain via a synchronizer. At block 402, a hint signal is generated responsive to the header block, which hint signal is positioned at least one cycle prior to the location of the data blocks. At block 404, the hint signal is transmitted to a control block in the second clock domain, thereby indicating that the data blocks may be sent to receiver circuitry in the second clock domain. At block 406, appropriate control signals are generated based on the hint signal for controlling output of the data blocks in a particular ordered grouping.

FIG. 5A-5E depict a plurality of timing drawings of received data and sent data associated with a plurality of control signals described above. As illustrated in FIG. 3, with reference to the timing drawing 500 of FIG. 5A, five FIRST CLOCK signals 302 are present within each timing window for every four SECOND CLOCK signals 304. Also, a SYNC pulse 306 is present that affects the transfer operations between the FIRST CLOCK domain and the SECOND CLOCK domain. Since five FIRST CLOCK signals 302 are present for every four SECOND CLOCK signals 304, one dead cycle per transmission window is present. Multiplexed packets 0 and 1 provide interleaved data blocks, i.e., $H_0$, $H_1$, $A_0$, $A_1$, $B_0$, $B_1$, $C_0$, $C_1$, $D_0$, and $D_1$, or channeled packet data. In the timing drawing 500 of FIG. 5A, the synchronizer controller provides advance notice of the location of the dead cycle by sending control signal c2b_valid_ff 312 to the control logic. Control signal c2b_valid_ff 312 indicates that the fifth cycle, cycle 4, of the timing window is a dead cycle for the transmission of data from the fast clock domain to the slow clock domain. It should be appreciated that although FIGS. 5A-5E are described with relation to control signal c2b_valid_ff 312, the systems and methods of the present invention may be practiced with any of the aforementioned control signals 312-320. Accordingly, the control logic and MUX of the present system transmit sent data 502 including the hint signal contiguously, i.e., $SXA_0B_0C_0D_0XA_1B_1C_1D_1X$, optimally positioning the hint signal (S) and data blocks about the dead cycles (X). In the embodiment described, the hint signal prepares the third circuit portion circuitry to forward the data blocks to receiving circuitry in the second clock domain without queuing. In particular, the positioning of the hint signal is adjusted so as not to coincide with a dead cycle. It should be appreciated that although timing drawing 500 only depicts packet 0 being transmitted (sent data 502), packet 1, i.e., $A_1B_1C_1D_1$, is transmitted as well. In particular, the following table illustrates the operations of one embodiment of the second circuit portion operating under control signal c2b_valid_ff 312 wherein data is received at the first cycle:

TABLE 1

Operation of Second Circuit Portion Under Control Signal c2b_valid_ff Upon Receiving Data at Cycle 0

| CYCLE | OPERATION(S) |
|---|---|
| 0 | Receive header block $H_0$ at control logic |
| 1 | Receive header block $H_1$ at control logic |
| 2 | Receive data block $A_0$ from channeled packet interface (CPI) <br> Temporarily store data block $A_0$ in a first queue |
| 3 | Receive data block $A_1$ from CPI <br> Temporarily store data block $A_1$ in second queue <br> Send hint signal generated responsive to header block $H_0$ <br> Prepare third circuit portion to pass through data blocks without queuing |
| 4 | Receive data block $B_0$ from CPI <br> Temporarily store data block $B_0$ in the first queue <br> Receive zero cycle advance notice of the location of the dead cycle at cycle 4 <br> No Transmission—Dead Cycle |
| 0 | Receive data block $B_1$ from CPI <br> Temporarily store data block $B_1$ in the second queue <br> Send data block $A_0$ |
| 1 | Receive data block $C_0$ from CPI <br> Temporarily store data block $C_0$ in the first queue <br> Send data block $B_0$ |
| 2 | Receive data block $C_1$ from CPI <br> Temporarily store data block $C_1$ in the second queue <br> Send data block $C_0$ |
| 3 | Data block $D_0$ passes through via a register without queuing |
| 4 | Receive data block $D_1$ from CPI <br> Temporarily store data block $D_1$ in the second queue <br> Receive zero cycle advance notice of the location of the dead cycle at cycle 4 <br> No Transmission—Dead Cycle |
| 0 | Send data block $A_1$ |
| 1 | Send data block $B_1$ |
| 2 | Send data block $C_1$ |
| 3 | Send data block $D_1$ |
| 4 | No Transmission—Dead Cycle |

Similarly, FIGS. 5B-E depict various configurations of sent data having contiguous data blocks with a hint signal positioned relative to a dead cycle. For example, with reference to timing drawing 504 of FIG. 5B, the received data 310 is received at the second cycle and control signal c2b_valid_ff 312 indicates that the dead cycle is positioned at the fifth cycle, cycle 4. Accordingly, the sent data 506 including the hint signal is transmitted as $SA_0B_0C_0XD_0$. It should be appreciated that the dead cycle may appear to be interleaved in between two data blocks or at the leading end, i.e., before $A_0$, or at the trailing end, i.e., after $D_0$, of a data packet. By way of example, the dashed lines of data blocks $A_0$, $B_0$, $C_0$, and $D_0$ indicate that due to the processing of the header block $H_0$, the data blocks $A_0$, $B_0$, $C_0$ and $D_0$ were not transmitted/received between the clock domains. For example, the processing of header block $H_0$ is time-consuming and the data blocks $A_0$, $B_0$, $C_0$ and $D_0$ are temporarily queued in the second clock domain before being forwarded to circuitry in the second clock domain. The hint signal minimizes timing problems by providing advance knowledge to the second clock domain that the processing of the header is on-going. This allows the data blocks $A_0$, $B_0$, $C_0$, and $D_0$ to be temporarily stored in the second clock domain (i.e., CLK2) before being forwarded to the receive circuitry therein. The following table illustrates the operations of one embodiment of the second circuit portion operating under control signal c2b_valid_ff 312 during the first ten cycle counts wherein data is received at the second cycle:

TABLE 2

Operation of Second Circuit Portion Under Control Signal c2b_valid_ff Upon Receiving Data at Cycle 1

| CYCLE | OPERATION(S) |
|---|---|
| 1 | Receive header block $H_0$ at control logic |
| 2 | Receive header block $H_1$ at control logic |
| 3 | Receive data block $A_0$ from CPI <br> Temporarily store data block $A_0$ in a first queue |
| 4 | Receive data block $A_1$ from CPI <br> Temporarily store data block $A_1$ in second queue <br> Receive zero cycle advance notice of the location of the dead cycle at cycle 4 |
| 0 | Receive data block $B_0$ from CPI <br> Temporarily store data block $B_0$ in the first queue <br> Send hint signal generated responsive to header block $H_0$ <br> Prepare third circuit portion to queue the data blocks |
| 1 | Receive data block $B_1$ from CPI <br> Temporarily store data block $B_1$ in the second queue <br> Send data block $A_0$ <br> Queue data block A0 in CLK2 domain |
| 2 | Receive data block $C_0$ from CPI <br> Temporarily store data block $C_0$ in the first queue <br> Send data block $B_0$ <br> Queue data block $B_0$ in CLK2 domain |
| 3 | Receive data block $C_1$ from CPI <br> Temporarily store data block $C_1$ in the second queue <br> Send data block $C_0$ <br> Queue data block $C_0$ in CLK2 domain |
| 4 | Receive data block $D_0$ from CPI <br> Temporarily store data block $D_0$ in the first queue <br> Receive zero cycle advance notice of the location of the dead cycle at cycle 4 <br> No Transmission—Dead Cycle |
| 0 | Receive data block $D_1$ from CPI <br> Temporarily store data block $D_1$ in the second queue <br> Send data block $D_0$ <br> Queue data block $D_0$ in CLK2 domain |

Figure 5E:
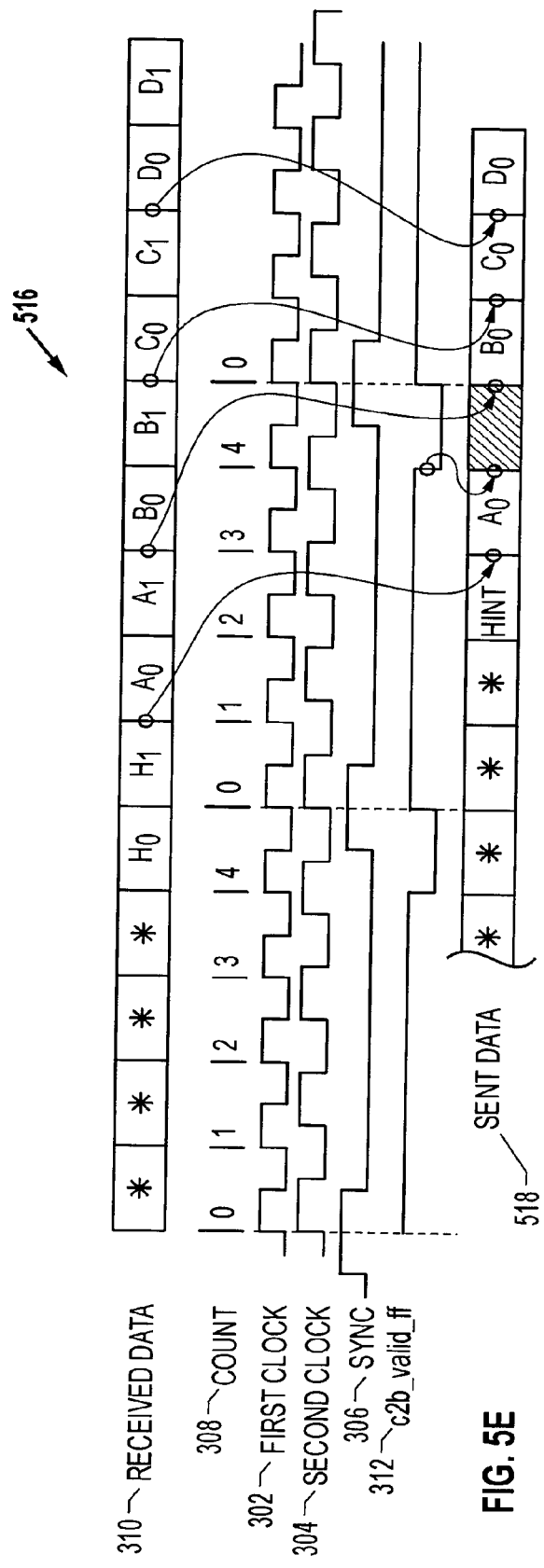
FIG. 5E depicts a timing drawing of data and received at a fifth cycle sent data associated with the control signal of the system illustrated in FIG. 3.

Similarly, with reference to timing drawing 508 of FIG. 5C, the received data 310 is received at the third cycle and the control signal c2b_valid_ff 312 indicates that the dead cycle is positioned at the fifth cycle, cycle 4. Accordingly, sent data 510 including the hint signal is transmitted as $SA_0B_0C_0XD_0$ to the synchronizer. With reference to timing drawing 512 of FIG. 5D, the received data 310 is received at the fourth cycle and the control signal c2b_valid_ff 312 provides advance notice that the dead cycle is located at the fifth cycle, cycle 4. The circuit therefore transmits sent data 514 including the hint signal as $SA_0B_0XC_0D_0$. Similar to the sent data 506 of FIG. 5B, the data blocks $A_0$, $B_0$, $C_0$, and $D_0$ of sent data 514 are exemplified with dashed lines to indicate that the processing of the header is consuming additional cycles and the data blocks will be temporarily queued in the second clock domain before being forwarded to I/O receive circuitry therein. With reference to timing drawing 516 of FIG. 5E, the received data 310 is received at the fifth cycle and the control signal c2b_valid_ff 312 indicates that the dead cycle is located at the fifth cycle, cycle 4. Hence, sent data 518 including a hint signal is transmitted $SA_0XB_0C_0D_0$. Importantly, the control logic block sends the hint signal in a manner that accommodates the dead cycle. As illustrated by the variable arrival times of the received data 310 in FIGS. 5A-5E, the hint signal described herein provides notice of a possible data transfer regardless of the cycle at which data is received.

Accordingly, it should be appreciated that by practicing the teachings described herein, latency may be reduced during the transmission of received data which includes a header. In particular, during the processing of the header block in the first clock domain, a hint signal is generated and positioned at least one cycle before the transmission of the data so that the hardware in the second clock domain can anticipate the arrival of the data and prepare accordingly. Moreover, it should be appreciated that the systems and methods described herein may be practiced with non-intervaled and any intervaled data, including multiplexed data, having any number of dead cycles.

Although the embodiments herein have been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A system for effectuating the transfer of data blocks including a header block across a clock boundary between a first clock domain and a second clock domain, wherein said first clock domain is configured to operate with a first clock signal and said second clock domain is configured to operate with a second clock signal, said first and second clock signals having a ratio of N first clock cycles to M second clock cycles, wherein N/M>1, comprising:
   a first circuit portion for providing said data blocks including said header block to a second circuit portion;
   control logic associated with said second circuit portion for processing said header block and generating, in response to said header block, a hint signal that gives advance notification of a possible data transfer operation, said hint signal being configured to be transferred via a synchronizer at least one data cycle prior to the transfer of said data blocks to a third circuit portion; and
   a control block associated with said third circuit portion, said control block operating responsive to said hint signal to generate data transfer control signals for controlling said third circuit portion in order to control output of said data blocks in a particular ordered grouping, wherein said first circuit portion, said second circuit portion and said control logic are disposed in said first clock domain and said third circuit portion and said control block are disposed in said second clock domain.

2. The system for effectuating the transfer of data blocks including a header block as recited in claim 1, further comprising a synchronizer controller disposed between said first and second clock domains for providing at least one dead cycle control signal to said second circuit portion, wherein said at least one dead cycle control signal is indicative of the location of at least one dead cycle between said first and second clock signal.

3. The system for effectuating the transfer of data blocks including a header block as recited in claim 1, wherein said first circuit portion comprises a packet interface.

4. The system for effectuating the transfer of data blocks including a header block as recited in claim 1, wherein said second circuit portion comprises:
   at least one queue operably coupled to said first circuit portion for temporarily storing said data blocks; and
   a multiplexer (MUX) block operably coupled to said first circuit portion and said at least one queue, said MUX block operating under a MUX selection control signal generated by said control logic for selecting between data blocks stored in said at least one queue and data blocks provided by said first circuit portion without queuing, whereby said data blocks are transmitted as an output of said MUX block to said synchronizer.

5. The system for effectuating the transfer of data blocks including a header block as recited in claim 1, wherein said third circuit portion comprises means for selecting between data blocks directly transmitted by said synchronizer and data blocks buffered in said second clock domain, said means operating responsive to at least a portion of said data transfer control signals.

6. The system for effectuating the transfer of data blocks including a header block as recited in claim 1, wherein said header block provides protocol control information relative to said data blocks.

7. The system for effectuating the transfer of data blocks including a header block as recited in claim 1, wherein each of said data blocks comprises multiple bits.

8. The system for effectuating the transfer of data blocks including a header block as recited in claim 1, wherein said data blocks include at least one interval interleaved therein.

9. The system for effectuating the transfer of data blocks including a header block as recited in claim 1, wherein said data blocks comprise multi-channeled packet data, each channel's data blocks being interleaved with data blocks of other channels.

10. A method for effectuating the transfer of data blocks including a header block across a clock boundary between a first clock domain and a second clock domain, wherein said first clock domain is configured to operate with a first clock signal (CLK1) and said second clock domain is configured to operate with a second clock signal (CLK2), comprising:
    processing a header block associated with data blocks that are to be sent from said first clock domain to said second clock domain via a synchronizer;
    generating a hint signal that gives advance notification of a possible data transfer operation responsive to said header block and positioning said hint signal at least one cycle prior to the location of said data blocks, said processing said header block and said generating said hint signal being performed in said first clock domain;
    transmitting said hint signal to a control block in said second clock domain, thereby indicating that said data blocks may be sent to receive circuitry in said second clock domain; and
    generating appropriate control signals based on said hint signal for controlling output of said data blocks in a particular ordered grouping.

11. The method for effectuating the transfer of data blocks including a header block as recited in claim 10, further comprising:
    generating advance notice indicative of the location of at least one dead cycle occurring between a first clock signal and a second clock signal used for transmitting data across a clock boundary;

receiving packet data and said advance notice indicative of the location of said at least one dead cycle;

calculating the optimal time to send said packet data relative to the location of said at least one dead cycle; and transmitting ordered contiguous data blocks about said at least one dead cycle to a CLK1-to-CLK2 synchronizer for transmission to receive circuitry disposed in said second clock domain.

12. The method for effectuating the transfer of data blocks including a header block as recited in claim 11, wherein said at least one dead cycle comprises N-M dead cycles, said first and second clock signals having a ratio of N first clock cycles to N second clock cycles such that N/M>1.

13. A computer system having circuitry for effectuating the transfer of data blocks including a header block across a clock boundary between a first clock domain and a second clock domain, wherein said first clock domain is configured to operate with a first clock signal (CLK1) and said second clock domain is configured to operate with a second clock signal (CLK2), said first and second clock signals having a ratio of N first clock cycles to M second clock cycles, wherein N/M>1, comprising:

means for processing a header block associated with said data blocks to determine whether said data blocks may be sent from said first clock domain to said second clock domain via a synchronizer;

means for generating a hint signal that gives advance notification of a possible data transfer operation responsive to said header block wherein said hint signal is configured to be positioned at least one cycle prior to the possible location of said data blocks, said means for processing a header block and said means for generating a hint signal being disposed in said first clock domain; and means for transmitting said hint signal to a control block in said second clock domain, thereby indicating that said data blocks may be sent to receive circuitry in said second clock domain, wherein said control block generates appropriate control signals based on said hint signal for controlling output of said data blocks in a particular ordered grouping.

14. The computer system as recited in claim 13, further comprising a multiplexer (MUX) block disposed in said second clock domain for operating responsive to at least a portion of said control signals.

15. The computer system as recited in claim 13, further comprising means for determining where a dead cycle occurs between said first and second clock signals.

16. The computer system as recited in claim 15, further comprising means for optimizing the position of said data blocks relative to said dead cycle.

* * * * *

UNITED STATES PATENT AND TRADEMARK OFFICE
CERTIFICATE OF CORRECTION

PATENT NO. : 7,623,482 B2 Page 1 of 1
APPLICATION NO. : 10/625291
DATED : November 24, 2009
INVENTOR(S) : Adkisson et al.

It is certified that error appears in the above-identified patent and that said Letters Patent is hereby corrected as shown below:

In column 11, line 13, in Claim 12, delete "N" and insert -- M --, therefor.

Signed and Sealed this

Sixteenth Day of March, 2010

David J. Kappos
*Director of the United States Patent and Trademark Office*